(12) United States Patent
Provencher

(10) Patent No.: US 6,736,406 B1
(45) Date of Patent: May 18, 2004

(54) SELF-ADHESIVE GASKET

(76) Inventor: Brian G. Provencher, 91 Coburn Ave., Nashua, NH (US) 03063

(*) Notice: Subject to any disclaimer, the term of this patent is extended or adjusted under 35 U.S.C. 154(b) by 0 days.

(21) Appl. No.: 10/138,599

(22) Filed: May 3, 2002

Related U.S. Application Data

(60) Provisional application No. 60/288,864, filed on May 4, 2001.

(51) Int. Cl.[7] ................................. F16J 15/02
(52) U.S. Cl. ..................... 277/628; 277/590; 277/602; 277/650; 285/910; 285/424; 285/139.1
(58) Field of Search ................ 277/590, 591, 277/602, 606, 608, 609, 616, 627, 628, 630, 637, 650, 654; 285/910, 424, 139.1, 139.2, 139.3; 52/220.8

(56) References Cited

U.S. PATENT DOCUMENTS

| | | | |
|---|---|---|---|
| 6,092,811 A | * 7/2000 | Bojarczuk et al. | 277/627 |
| 6,190,751 B1 | 2/2001 | Sylvester | 428/66.4 |
| 6,328,313 B1 | * 12/2001 | Teranishi et al. | 277/592 |

OTHER PUBLICATIONS

Pamphlet, Bath Drains, Series 41–500, 41–600, 41–800, Gerber Plumbing Fixtures Corp., 4600 West Touhy Avenue, Lincolnwood, IL 60712–1699.
MOEN Installation Instructions, MT150A, Two Handle Lavatory Faucets, Copyright 1995, Moen Incorporated.
SilverCast Stainless Steel Sinks, Illustrated Instructions for all Diamond Series, Meridian Series, Select Series, SilverCast, A Divisionof C.L. Watt, Inc., 947 North Plumb Grove Road, Schaumberg, IL 60173.
Installation Instructions (Clamp Cup Style Body)—Kitchen Sink device—Mfg.: Garvin— Model #1120.

* cited by examiner

*Primary Examiner*—Robert J. Sandy
*Assistant Examiner*—D. Melwani
(74) *Attorney, Agent, or Firm*—Hayes Soloway PC

(57) ABSTRACT

A self-adhesive gasket having a pressure sensitive adhesive on one side or on both sides can be used in place of plumbers putty to seal sinks to countertops, faucets to sinks, and strainers and pop ups to sinks and tubs. The gasket is preferably preformed from a flexible cellular plastic, preferably a closed cell urethane foam. The gasket may be used in a multitude of plumbing application to form a liquid seal.

6 Claims, 4 Drawing Sheets

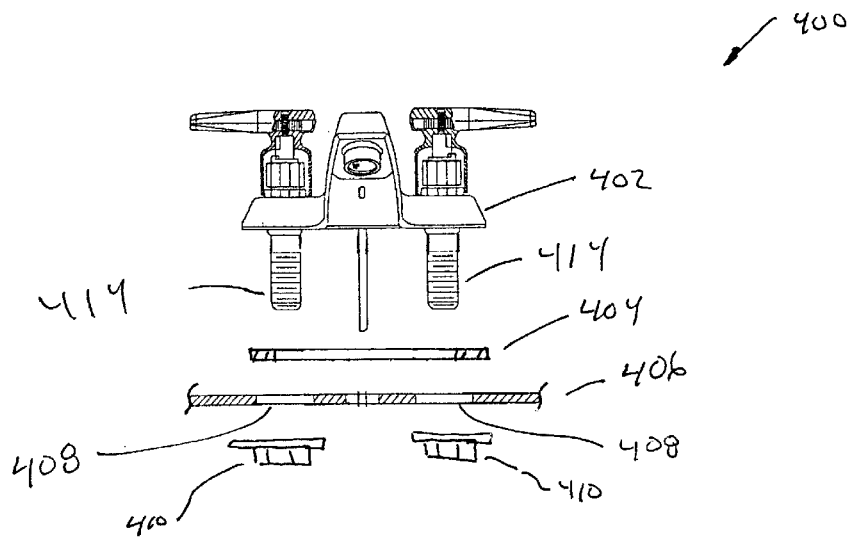
Figure 4
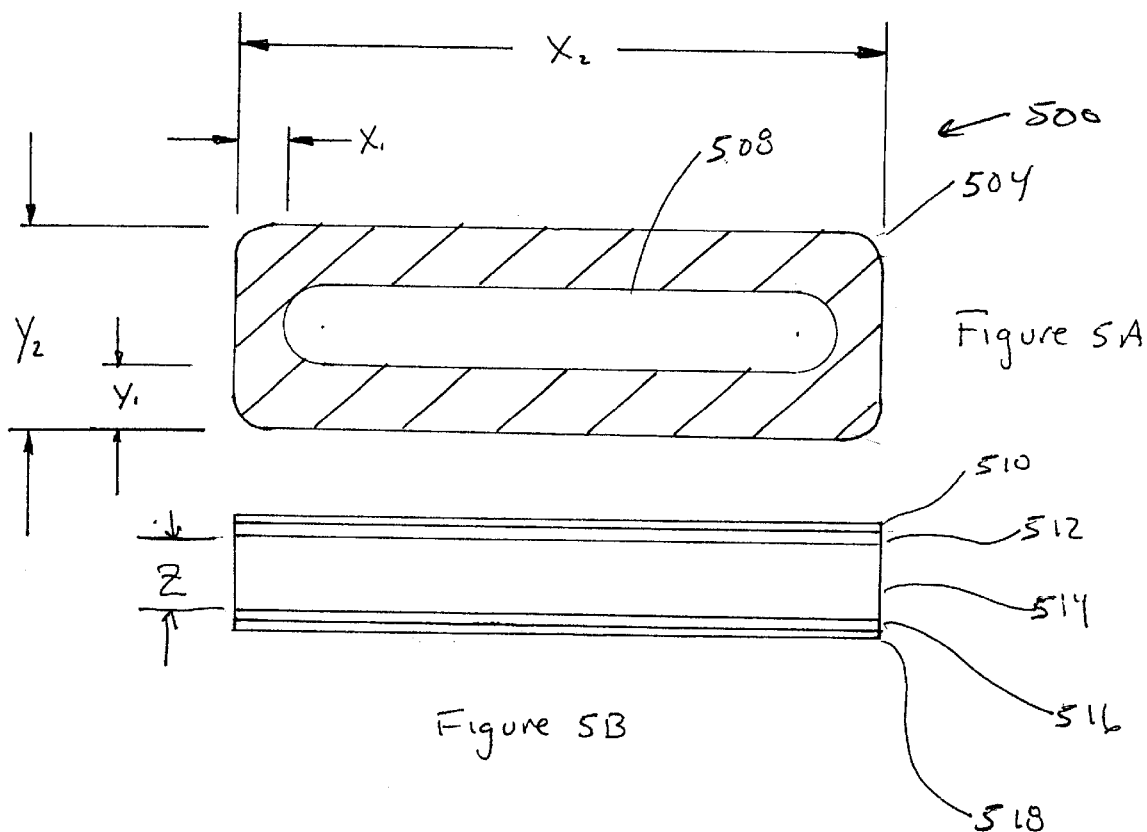
Figure 5A
Figure 5B

SELF-ADHESIVE GASKET

CROSS-REFERENCE TO RELATED APPLICATION

This application claims the benefit of copending U.S. provisional patent application serial No. 60/288,864 filed May 4, 2001, the teachings of which are incorporated herein by reference.

FIELD OF THE INVENTION

The invention relates generally to gaskets and more particularly to a self-adhesive cellular plastic gaskets for use in plumbing.

DESCRIPTION OF RELATED ART

Plumbers for many years have used plumber's putty to form a liquid seal around sink strainers, pop ups, bath drains, faucets, and sinks. The putty is sold in bulk and has the consistency of cookie dough. The plumber takes a clump of putty and works it in his hand to form a bead typically less than ½" in diameter. When the putty is cold it becomes more difficult to form into a bead. The forming of the putty into a bead is time consuming and is prone to error. After the plumber forms the putty into a bead, he then secures the bead to one of the two items to be joined and then presses the two items together. The two items are then mechanically fastened together with screws, bolts, clips, or other fastener. As the two items are brought together, the putty oozes out. To finish the installation, the plumber must remove any excess putty. One of the biggest drawbacks of using the putty is the amount of time necessary to do a good job. Another drawback of using putty is that the putty tends to stain the plumber's hand and any item the plumber contacts.

Rubber gaskets have been used for many years to provide a waterproof joint when joining plumbing flanges. Often the rubber gaskets are used to join two flanges that do not rotate in relationship to each other. The rubber gasket is inserted between the flanges and then bolts are tightened to pull the flanges together. A drawback to the rubber gaskets is that they tend to move around as the items to be joined are pulled together.

Rubber gaskets have been used between items that rotate in relation to each other such as a sink strainer and a sink with limited success. As the strainer is pulled towards the sink by a nut on the opposite side of the sink, the rubber gasket tends to be squished outward and leaves a gap which can allow water or other liquids to escape.

Common weather stripping is well known. This product is frequently a thick but narrow strip of closed cell plastic flexible foam with a single layer of pressure sensitive adhesive on one surface that is protected by a release liner. The release liner is removed and the weather stripping is adhered or stuck around a doorframe, a window frame, etc. to seal out wind and noise. The weather stripping is typically positioned between two items that are not intended to be secured together permanently.

There is a need for a self-adhesive gasket that will overcome the deficiencies in the prior art and a method for joining plumbing components together to form a liquid tight seal.

SUMMARY OF THE INVENTION

A self-adhesive gasket is provided comprising a layer of pressure sensitive adhesive applied to one or both sides of a layer of flexible cellular plastic. The gasket may be formed in any shape, including, but not limited to, circles and rectangles, to seal plumbing components together. The shape is preferably formed by die-cutting a self-adhesive cellular plastic. Alternatively, the gasket may be formed from a narrow strip of cellular plastic having an adhesive secured on one or both sides, the user manually aligning the gasket on the surface to be joined.

BRIEF DESCRIPTION OF THE DRAWINGS

FIG. 4 is an exploded profile view of a faucet secured to a countertop or other surface in accordance with the present invention.

FIG. 5A is a top view of a preformed gasket in accordance with the present invention.

FIG. 5B is a profile view of preformed gasket of FIG. 5A.

DETAILED DESCRIPTION OF THE INVENTION

Figure 1:
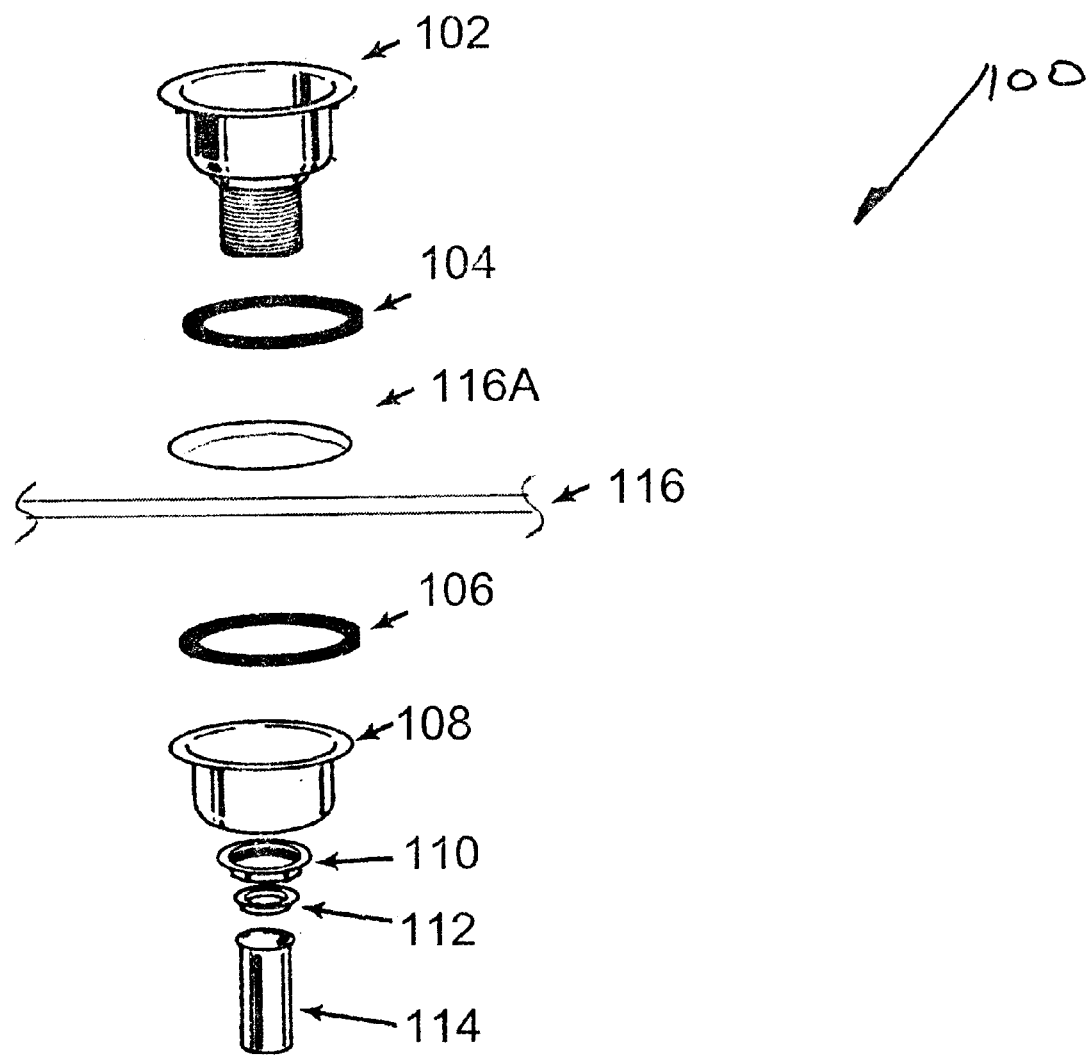
FIG. 1 is an exploded view of a sink strainer assembly in accordance with the present invention.

With reference to FIG. 1, a sink strainer assembly 100 is shown. The assembly 100 comprises a strainer body 102, a gasket 104, a washer 106, a clamp cup 108, a locknut 110, and a tailpiece washer 112, coupled to a tailpiece 114. The gasket 104 may be a compressible gasket, preferably comprised of cellular plastic, more preferably a closed cell urethane foam, and even more preferably International Tape #308SF. The gasket is preferably die cut having a circular inner and outer diameter. The thickness of the gasket and the inner and outer diameter can be modified to meet the specific application. The Gasket 104 is shown as circular, but it can be any other shape to meet the specific application. The gasket has an adhesive layer on a first side and a second and opposing side. Each of the adhesive layers may be covered by a release layer to prevent two gaskets from inadvertently sticking together. The installer, typically a plumber, removes the upper release layer and secures the gasket 104 to the bottom surface of the sink strainer 102. The plumber then removes the lower release layer and inserts the strainer 102 with the gasket 104 secured thereto in an opening 116A in a sink 116. The installer then threads the locknut 110 onto the threaded portion of the sink strainer 102. By tightening the locknut 110, the gasket 104 is compressed between the bottom surface of the sink strainer 102 and the upper surface of the sink 116. Since the sink strainer 102 is adhesively coupled to the upper surface of the sink, the installer may not have to prevent the sink strainer 102 from rotating while he tightens the locknut 110. The gasket 104 forms a water-tight seal between the sink strainer and the sink. In the prior art the seal between the sink strainer and the sink was formed by plumber putty. Alternatively, the gasket 104 may be applied to the sink 116 first.

Figure 2:
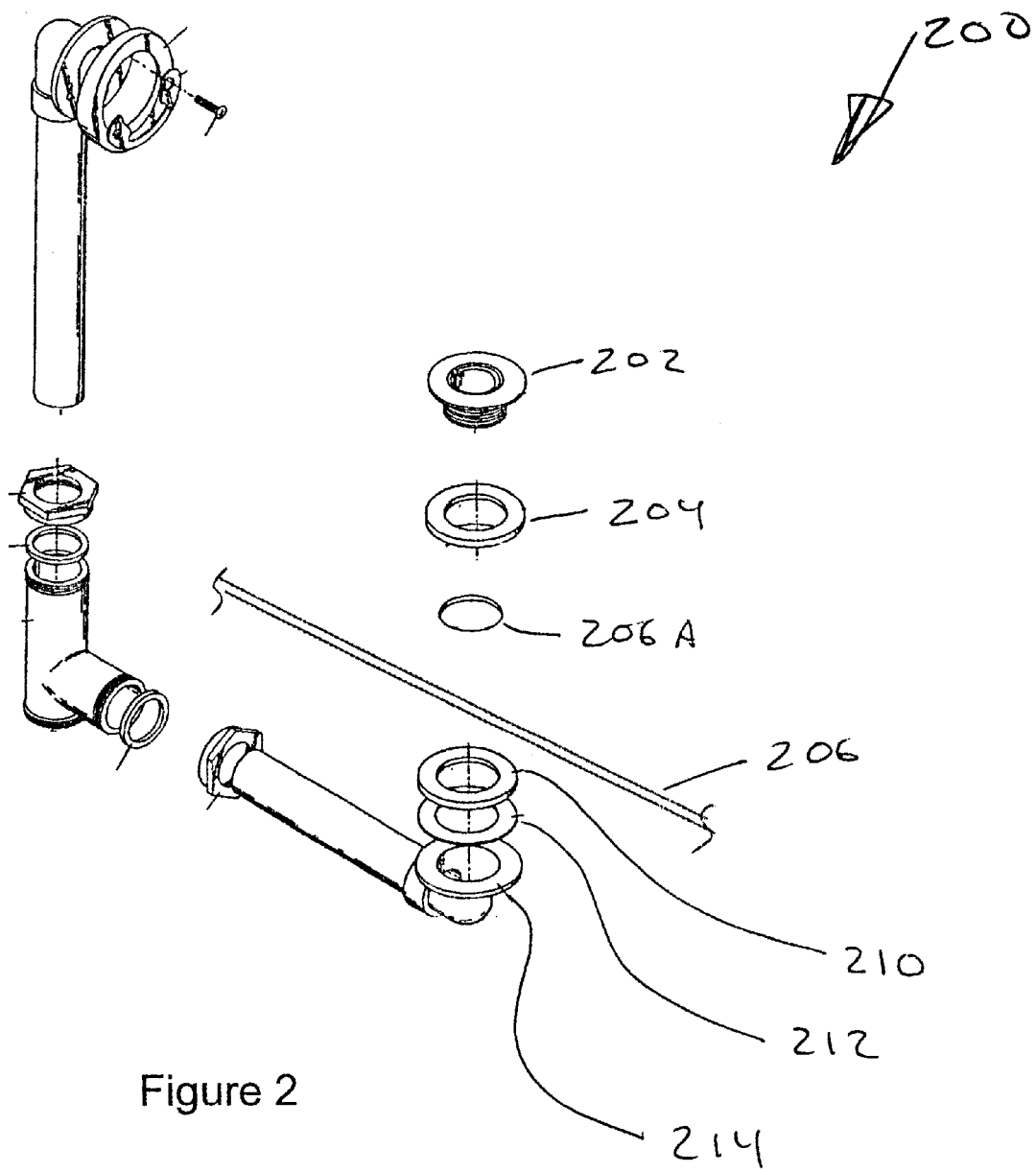
FIG. 2 is an exploded view of shower or tub drain assembly in accordance with the present invention.

FIG. 2 shows a shower or tub drain assembly 200. The assembly comprises a strainer 202, a gasket 204, a rubber washer 210, and a fiber washer 212 coupled to a drain shoe 214. The inner surface of the drain shoe is threaded to match the threads of the strainer 202. In this application the drain shoe is stationary and the strainer 202 is rotated during installation. The gasket 204 may be a compressible gasket, preferably comprised of cellular plastic, more preferably a closed cell urethane foam, and even more preferably International Tape #308SF. The gasket is preferably die cut having a circular inner and outer diameter. The thickness of the gasket and the inner and outer diameter can be modified to meet the specific application. The gasket 204 is shown as circular, but it can be any other shape to meet the specific application. The gasket has an adhesive layer on a first side. The adhesive layer may be covered by a release layer to prevent two gaskets from inadvertently sticking together. The installer removes the release layer and secures the gasket 204 to the bottom surface of the sink strainer 202. The installer then inserts the strainer 202 with the gasket 204 secured thereto in an opening 206A in a tub or shower floor 206. The installer then threads the strainer into the threaded portion of the drain shoe 214. By rotating the strainer 202, the gasket 204 is compressed between the bottom surface of the strainer 202 and the upper surface of the tub or shower floor 206. Since the strainer 202 needs to rotate relative to the surface of the tub or shower floor 206, no adhesive is applied to the lower surface of the gasket 204. Alternatively, the lower surface of the gasket 204 may include an adhesive layer, and the installer lubricates the surface to temporarily disable the adhesive. The installer may user water or saliva. The gasket 204 forms a water-tight seal between the strainer 202 and the tub or shower floor 206. In the prior art the seal between the strainer and the tub or shower floor was formed by plumber putty.

Figure 3:
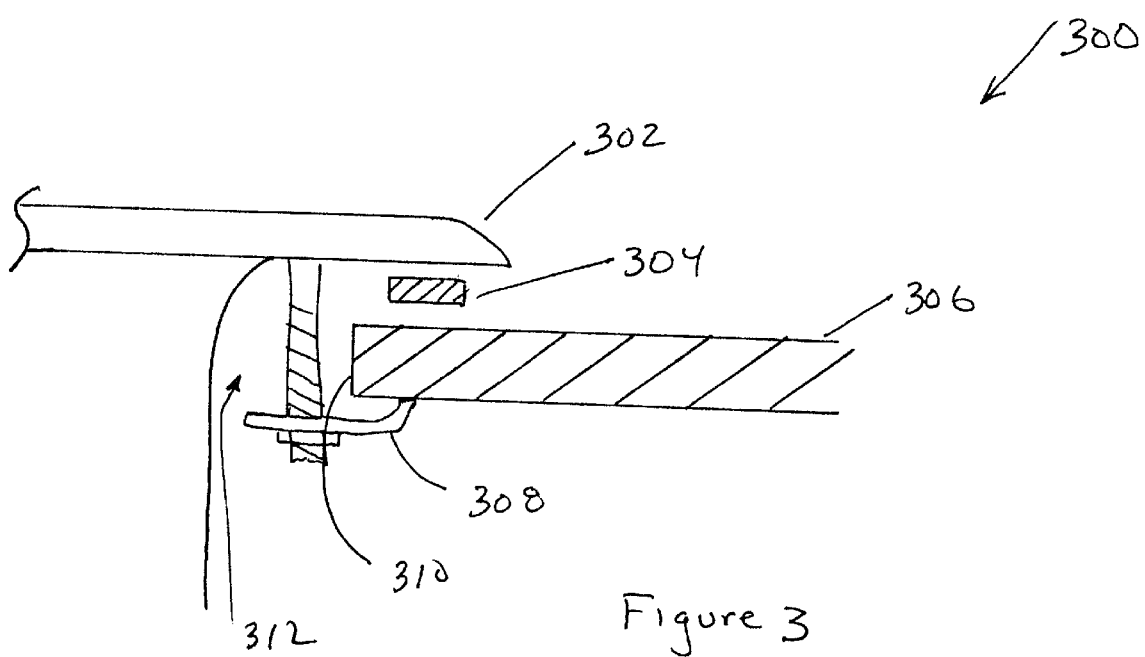
FIG. 3 is an exploded profile view of a sink or tub secured to a countertop or other surface in accordance with the present invention.

FIG. 3 shows an exploded profile view of a sink assembly 300. The sink assembly comprises a sink or tub 302, a surface 306, (a countertop for example), and a gasket 304. The gasket 304 is compressed between the sink or tub 302 and the surface 306 by the weight of the tub or sink and the force provided by a mechanical fastener 308. The gasket 304 may be a compressible gasket, preferably comprised of cellular plastic, more preferably a closed cell urethane foam, and even more preferably International Tape #308SF. The gasket 304 is preferably die cut in a shape such that the gasket fits between the outside edge 310 of the opening 312 in the surface 306 and the outside edge of the sink or tub 302. The thickness of the gasket and the dimensions can be modified to meet the specific application. The gasket has a first adhesive layer on a first side and may have a second adhesive layer on a second and opposite side. The adhesive layers may be covered by a release layer to prevent two gaskets from inadvertently sticking together. The installer removes the first release layer and secures the gasket 304 to the bottom surface of the sink or tub 302. The installer then removes the second release layer and inserts the sink or tub 302 with the gasket 304 secured thereto in the opening 312 the surface 306. The installer then tightens the sink or tub 302 to the surface 306 using the mechanical fastener 308. The gasket 304 is compressed between the bottom surface of the sink or tub 302 and the surface 306 and forms a water-tight seal. In the prior art the seal between the sink or tub 302 and the surface 306 was formed by plumber putty. Alternatively, the gasket 304 may be applied to the surface 306 first.

FIG. 4 shows an exploded profile view of a faucet assembly 400. The faucet assembly comprises a faucet 402, a surface 406, (a countertop for example), and a gasket 404. The gasket 404 is compressed between the faucet 402 and the surface 406 by the force provided by a mechanical fastener 410. The gasket 404 may be a compressible gasket, preferably comprised of cellular plastic, more preferably a closed cell urethane foam, and even more preferably International Tape #308SF. The gasket 404 is preferably die cut in a shape such that the gasket fits under the skirt along the bottom surface of the faucet 402. The thickness of the gasket and the dimensions can be modified to meet the specific application. The gasket has a first adhesive layer on a first side and may have a second adhesive layer on a second and opposite side. The adhesive layers may be covered by a release layer to prevent two gaskets from inadvertently sticking together. The installer removes the first release layer and secures the gasket 404 to the bottom surface of the faucet 402. The installer then inserts the faucet 402 with the gasket 404 secured thereto in an openings 408 in the surface 406. The installer then threads the mechanical fastener 410 onto the threaded portion 414 of the faucet 402 and tightens the faucet 402 to the surface 406. The gasket 404i is compressed between the bottom surface of the faucet 402 and the surface 406 and forms a water-tight seal between the faucet 402 and the surface 406. In the prior art the seal between the faucet and the sink was formed by plumber putty. Alternatively, the gasket 404 may be applied to the surface 406 first.

FIG. 5A shows a gasket 500. The gasket is useful in FIGS. 3 and 4. The gasket is shown rectangular having outside dimensions $X_2$ and $Y_2$. The gasket is shown having a width $X_1$ and $Y_1$. $X_1$ and $Y_1$ may be the same or different. The gasket 500 comprises a compressible layer 514, preferably cellular plastic, a first adhesive layer 512 covered by a first release layer 510. The gasket 500 may include a second adhesive layer 516 covered by a second release layer 518. The compressible layer 514 having a thickness Z. A preferred range for the thickness is 0.05–0.5". A suitable compressible material is available from International Tape part No. 308SF. The adhesive layer is preferably a pressure sensitive adhesive, more preferably an acrylic adhesive.

Alternatively, the gasket can be sold in strips on a roll, the width of the strip ranging from ⅛" to 1". The installer would remove the release layer and secure the strip to the item to be sealed.

The gaskets may be shaped as circles (see FIGS. 1 and 2), squares or rectangles (see FIGS. 3, 4, and 5) or any other desired shape. Alternatively the gasket may have small cut outs for bolt, screw, fastener, etc.

Although particular embodiments of the invention have been described in detail, it is understood that the invention is not limited correspondingly in scope, but includes all changes and modifications coming within the spirit and terms of the claims appended hereto.

What is claimed is:

1. A method of coupling a strainer to a basin, comprising the steps of:

acquiring a preformed compressible gasket having a first adhesive surface and a second and opposing adhesive surface with the adhesive surfaces having an adhesive layer applied thereto, wherein the adhesive layers are protected by a removable release layer;

removing the release layer;

automatically securing the gasket to a surface of one of the strainer or the basin, wherein the step of automatically securing is performed by pressing the gasket to the surface of one of the strainer or the basin, thereby causing the gasket to automatically secure to the surface of one of the strainer or the basin;

inserting the strainer in an opening on the basin and applying pressure on the strainer, thereby automatically bonding the gasket to the other of the strainer or the basin surface, the bond between the gasket and the strainer, and the gasket and the basin, preventing the strainer from rotating within the opening in the basin; and tightening a nut to the strainer from an opposite surface of the basin to mechanically couple the strainer and the basin and compress the gasket to form a liquid-tight seal between the strainer and the basin.

2. The method of claim 1, wherein the gasket is secured to the strainer first.

3. The method of claim 1, wherein the gasket is secured to the basin first.

4. A method of coupling a strainer to a sink or tub, comprising the steps of:

acquiring a preformed compressible gasket having a first adhesive surface and a second and opposing adhesive surface with the adhesive surfaces having an adhesive layer applied thereto, wherein the adhesive layers are protected by a removable release layer;

removing the release layer;

automatically securing the first adhesive surface of the gasket to an underside of the strainer wherein the step of automatically securing is performed by pressing the gasket to the underside of the strainer, thereby causing the gasket to automatically secure to the underside of the strainer;

inserting the strainer in an opening in the sink or tub and applying pressure on the strainer, thereby automatically bonding the gasket to the sink or tub, the bond between the gasket and the strainer, and the gasket and the sink or tub, preventing the strainer from rotating within the opening in the sink or tub; and tightening a nut to the strainer from an opposite surface of the sink or tub to mechanically couple the strainer and the sink or tub and compress the gasket to form a liquid-tight seal between the strainer and the sink or tub.

5. The method of claim 4, wherein the gasket is secured to the sink or tub first.

6. The method of claim 4, wherein the strainer is rotated to engage mating threads in a receiving member to mechanically couple the strainer and the sink or tub and compress the gasket to form a liquid-tight seal.

* * * * *

UNITED STATES PATENT AND TRADEMARK OFFICE
CERTIFICATE OF CORRECTION

PATENT NO. : 6,736,406 B1
DATED : May 18, 2004
INVENTOR(S) : Provencher

It is certified that error appears in the above-identified patent and that said Letters Patent is hereby corrected as shown below:

Column 5,
Line 4, before "between", change "*scal*" to -- *seal* --.

Signed and Sealed this

Twenty-eighth Day of September, 2004

JON W. DUDAS
*Director of the United States Patent and Trademark Office*